United States Patent
Kim et al.

(10) Patent No.: US 10,555,270 B2
(45) Date of Patent: Feb. 4, 2020

(54) METHOD AND APPARATUS FOR CONFIGURING SYNCHRONIZATION SIGNAL IN WIRELESS COMMUNICATION SYSTEM ON BASIS OF REPEATING PATTERN CONSIDERING CELL COVERAGE

(71) Applicant: LG ELECTRONICS INC., Seoul (KR)

(72) Inventors: Kitae Kim, Seoul (KR); Jiwon Kang, Seoul (KR); Kilbom Lee, Seoul (KR); Kungmin Park, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/561,634

(22) PCT Filed: Mar. 29, 2016

(86) PCT No.: PCT/KR2016/003189
§ 371 (c)(1),
(2) Date: Sep. 26, 2017

(87) PCT Pub. No.: WO2016/159630
PCT Pub. Date: Oct. 6, 2016

(65) Prior Publication Data
US 2018/0077662 A1    Mar. 15, 2018

Related U.S. Application Data

(60) Provisional application No. 62/142,494, filed on Apr. 3, 2015.

(51) Int. Cl.
*H04W 64/00* (2009.01)
*H04W 4/02* (2018.01)
(Continued)

(52) U.S. Cl.
CPC ....... *H04W 56/0005* (2013.01); *H04W 4/025* (2013.01); *H04W 16/24* (2013.01); *H04W 64/003* (2013.01)

(58) Field of Classification Search
CPC .......................... H04W 56/0005; H04W 4/025
(Continued)

(56) References Cited

U.S. PATENT DOCUMENTS

2002/0075833 A1* 6/2002 Dick .................... H04B 1/7083
370/336
2002/0154609 A1* 10/2002 Saito .................. H04B 1/70755
370/324
2005/0277424 A1   12/2005 McKenna et al.

FOREIGN PATENT DOCUMENTS

KR    10-2007-0099483 A    10/2007
KR       10-1330795 B1     11/2013
(Continued)

*Primary Examiner* — Angel T Brockman
(74) *Attorney, Agent, or Firm* — Birch, Stewart, Kolasch & Birch, LLP

(57) ABSTRACT

Provided are a method and an apparatus for transmitting, on the basis of a repeating pattern, a synchronization signal in a wireless communication system. A base station divides a cell into multiple sectors and transmits multiple types of synchronization signals, which respectively correspond to the multiple sectors and have different repeating patterns, to a terminal through a system frame. The terminal performs detection of the multiple types of synchronization signals having the different repeating patterns and determines the position of the terminal within the cell according to the detected synchronization signals.

6 Claims, 21 Drawing Sheets

(51) Int. Cl.
*H04W 56/00* (2009.01)
*H04W 16/24* (2009.01)

(58) Field of Classification Search
USPC .......................................................... 370/350
See application file for complete search history.

(56) References Cited

FOREIGN PATENT DOCUMENTS

KR   10-2014-0128059 A   11/2014
WO      WO 02/47411 A1    6/2002

* cited by examiner

METHOD AND APPARATUS FOR CONFIGURING SYNCHRONIZATION SIGNAL IN WIRELESS COMMUNICATION SYSTEM ON BASIS OF REPEATING PATTERN CONSIDERING CELL COVERAGE

CROSS REFERENCE TO RELATED APPLICATIONS

This application is the National Phase of PCT International Application No. PCT/KR2016/003189, filed on Mar. 29, 2016, which claims priority under 35 U.S.C. 119(e) to U.S. Provisional Application No. 62/142,494, filed on Apr. 3, 2015, all of which are hereby expressly incorporated by reference into the present application.

BACKGROUND OF THE INVENTION

Field of the Invention

The present invention relates to a wireless communication, more particularly, a method and apparatus for configuring a synchronization signal on basis of a repeating pattern considering a cell coverage in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As a way to improve the efficiency of limited resources, so-called multi-antenna technology is being actively developed which achieves diversity gain by putting multiple antennas on the transmitter and receiver to cover more spatial regions for resource utilization, and which increases transmission capacity by transmitting data in parallel through each antenna. Multi-antenna technology may employ beamforming and/or precoding to improve signal-to-noise ratio (SNR). In closed-loop systems that can use feedback information at the transmitting end, beamforming and/or precoding may be used to maximize SNR through such feedback information. Beamforming is broadly classified into analog beamforming and digital beamforming.

Massive multiple-input multiple-output (MIMO) is a multi-antenna technology in which tens of antennas or even more, which is a lot more than now, are put into a base station to achieve higher data rates and higher energy efficiency. When conventional analog beamforming and/or digital beamforming is directly used in massive MIMO, signal processing and/or hardware implementation can get very complex, or the performance increase through the use of multiple antennas is only slight and the flexibility of resource allocation may be reduced. Consequently, the use of hybrid beamforming, a combination of conventional analog and digital beamforming, in massive MIMO is under discussion.

Recently, due to the rapid spread of mobile smart devices and the emergence of big data, mobile traffic is expected to be doubled every year and increased more than 1000 times in 10 years. The burden of mobile network operators have been increased due to the explosion of mobile traffic, and existing 4G mobile communication systems with limited additional frequency coverage cannot accommodate the explosive mobile traffic. Therefore, the development of 5th generation mobile communication technology based on millimeter wave (mmWave) capable of securing broadband is being discussed. The millimeter wave is a frequency band of 30-300 GHz which is generally called extremely high frequency (EHF) band and has its wavelength of 1 cm to 1 mm. The wave with the wavelength is in the middle of the currently used radio frequency band and the infrared ray (its wavelength about 0.1 mm), and it is very close to the light and is used in high resolution radar and microwave spectroscopy. The millimeter wave has less diffraction properties and larger directive properties than the conventional communication wave, and has larger diffraction properties, and less directive properties than the laser beam. When millimeter waves are used for communication, it is considered that ultra-multiple communications is possible in that far exceeds the microwave communication capacity, but there is large transmission loss in the spatial transmission. This is because the energy absorption by the oxygen and water molecules in the atmosphere is relatively large compared to the existing cellular frequency, resulting in high path loss.

Since synchronization signal is directly related to service coverage, all the user equipments in the cell should be able to receive the synchronization signal stably, regardless of its position. In a wireless communication system operating a massive MIMO and/or operating in a millimeter wave band, a method of stably transmitting a synchronization signal may be required.

SUMMARY OF THE INVENTION

The present invention provides a method and apparatus for configuring a synchronous signal based on a repetition pattern in consideration of cell coverage in a wireless communication system. The present invention provides a method and apparatus for transmitting a downlink synchronization signal in consideration of beam broadness when operating a transmitting/receiving end by using a massive MIMO. The present invention also provides a method and apparatus for determining a repetition pattern of a synchronous signal in consideration of the performance of a received signal of a user equipment according to a beam broadness by analog beamforming or digital beamforming.

In an aspect, a method for transmitting a synchronization signal based on a repetition pattern by a base station in a wireless communication system is provided. The method includes dividing a cell into multiple sectors, transmitting multiple types of synchronization signals, which respectively correspond to the multiple sectors and have different repetition patterns, to a user equipment through a system frame.

In another aspect, a method for detecting a synchronization signal based on a repetition pattern by a user equipment in a wireless communication system is provided. The method includes performing detection of multiple types of synchronization signals having different repetition patterns, and determining a position of the user equipment within a cell according to the detected synchronization signals.

According to the present invention, appropriate synchronization signal in consideration of beam broadness and repetition pattern according to beamforming can be transmitted to a user equipment.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
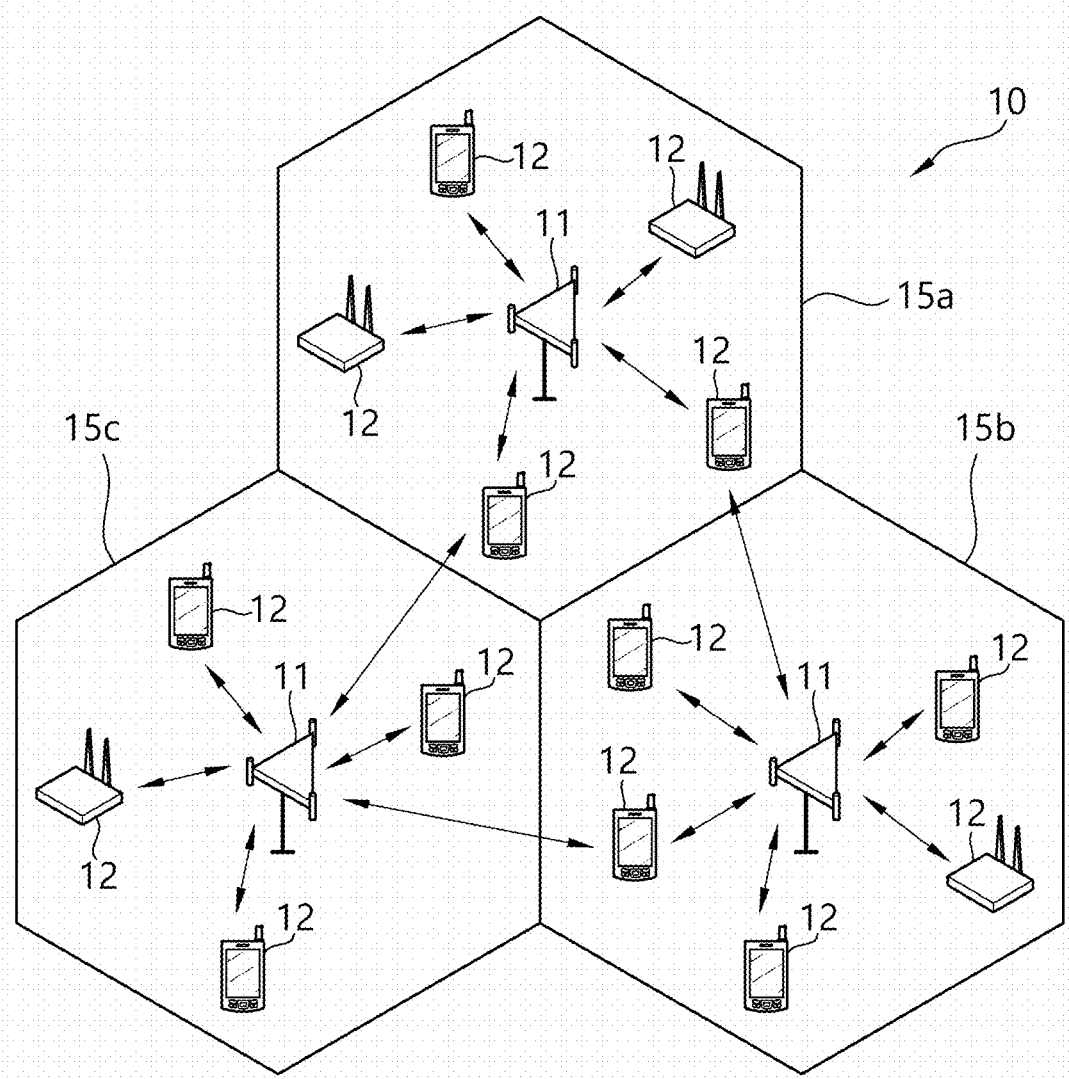
FIG. 1 shows a cellular system.

FIG. 1 shows a cellular system. Referring to FIG. 1, the cellular system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The cellular system includes a different cell adjacent to the serving cell. The different cell adjacent to the serving cell is called a neighbor cell. A BS providing a communication service to the neighbor cell is called a neighbor BS. The serving cell and the neighbor cell are relatively determined based on a UE.

This technique can be used for downlink (DL) or uplink (UL). In general, DL refers to communication from the BS 11 to the UE 12, and UL refers to communication from the UE 12 to the BS 11. In DL, a transmitter may be part of the BS 11 and a receiver may be part of the UE 12. In UL, a transmitter may be part of the UE 12 and a receiver may be part of the BS 11.

Figure 2:
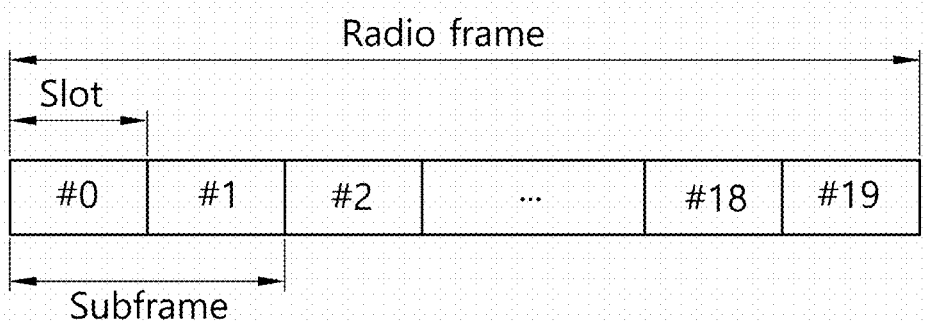
FIG. 2 shows a structure of a radio frame of 3GPP LTE.

FIG. 2 shows a structure of a radio frame of 3GPP LTE. Referring to FIG. 2, a radio frame consists of 10 subframes, and a subframe consists of two slots. Slots within the radio frame are numbered from #0 to #19. A transmission time interval (TTI) is a basic scheduling unit for data transmission. In 3GPP LTE, one TTI may be equal to the time it takes for one subframe to be transmitted. One radio frame may have a length of 10 ms, one subframe may have a length of 1 ms, and one slot may have a length of 0.5 ms.

One slot includes a plurality of orthogonal frequency division multiplexing (OFDM) symbols in time domain and a plurality of subcarriers in frequency domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners. 3GPP LTE defines one slot as 7 OFDM symbols in a normal cyclic prefix (CP) and one slot as 6 OFDM symbols in an extended CP.

When a UE is powered on or newly enters a cell, the UE may perform a cell search procedure such as acquiring time and frequency synchronization with the cell and detecting a physical cell identity (PCI) of the cell. To this end, the UE may receive a synchronization signal from the base station, synchronize with the base station, and obtain information such as a cell identifier or the like. The synchronization signal may include a primary synchronization signal (PSS) and a secondary synchronization signal (SSS).

The need for hybrid beamforming will be described. Beamforming technology using multiple antennas may be broadly divided into analog beamforming technology (hereinafter, "analog beamforming") and digital beamforming technology (hereinafter, "digital beamforming") depending on where a beamforming weight vector (or precoding vector) is applied.

Figure 3:
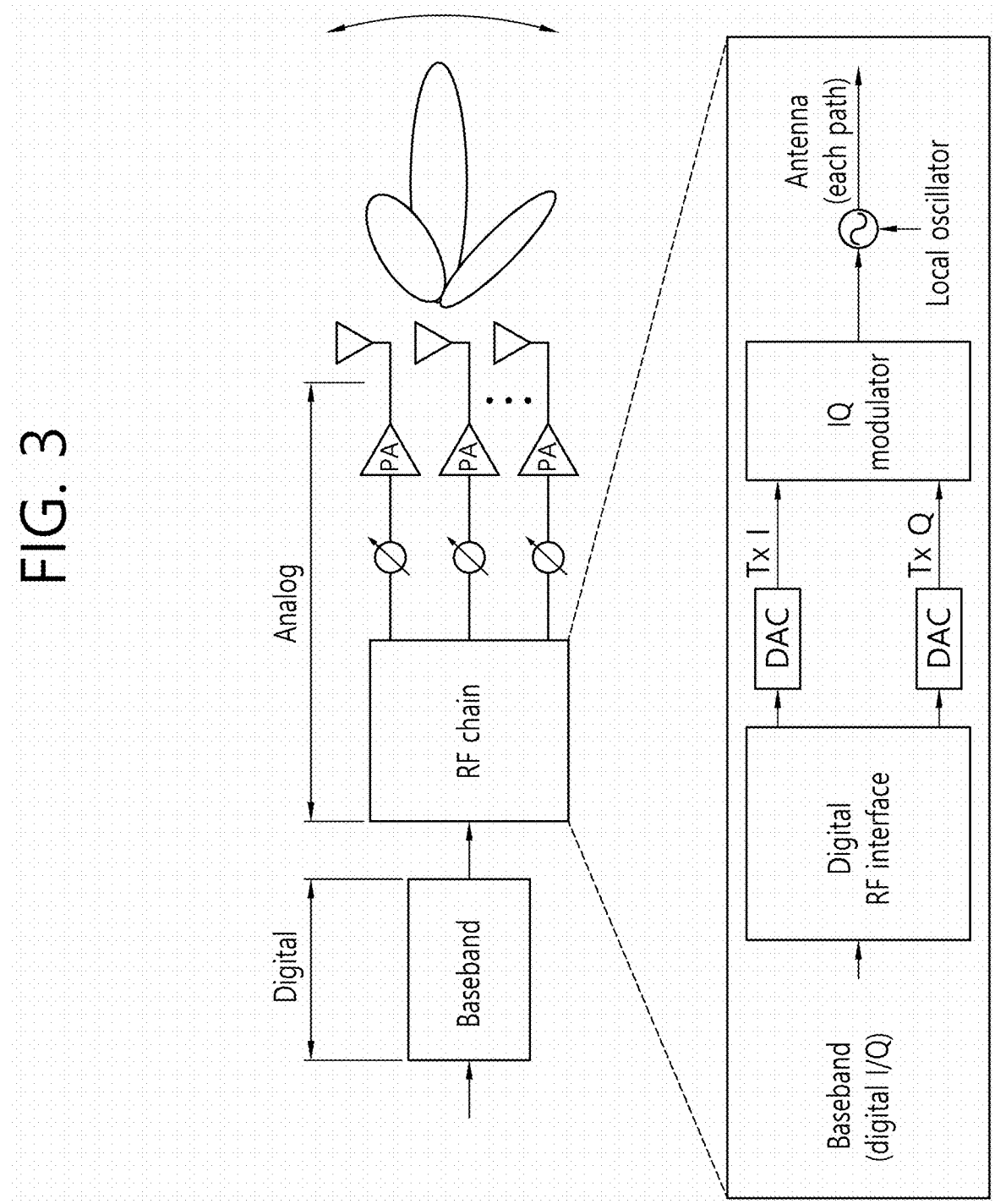
FIG. 3 is a block diagram of a transmitter including an analog beamformer and a radio frequency (RF) chain.

FIG. 3 is a block diagram of a transmitter including an analog beamformer and a radio frequency (RF) chain. Analog beamforming is a typical beamforming technique applied to earlier multi-antenna structures. In analog beamforming, a beam is formed by partitioning an analog signal, produced by digital signal processing, into a plurality of paths and configuring the phase shift (PS) and power amplifier (PA) settings for each path. Referring to FIG. 3, an analog signal derived from a single digital signal is processed by the PS and PA connected to each antenna. That is, the PS and the PA handles complex weights in the analog stage. Here, the RF chain refers to a processing block that converts a baseband signal into an analog signal. In analog beamforming, beam precision is determined by the element characteristics of the PS and PA, and the control characteristics of the element make analog beamforming advantageous for narrowband transmission. Moreover, the hardware structure makes it difficult to implement multi-stream transmission, thus making the multiplexing gain for higher data rates relatively small and making it impractical to form a beam per user based on orthogonal resource allocation.

Figure 4:
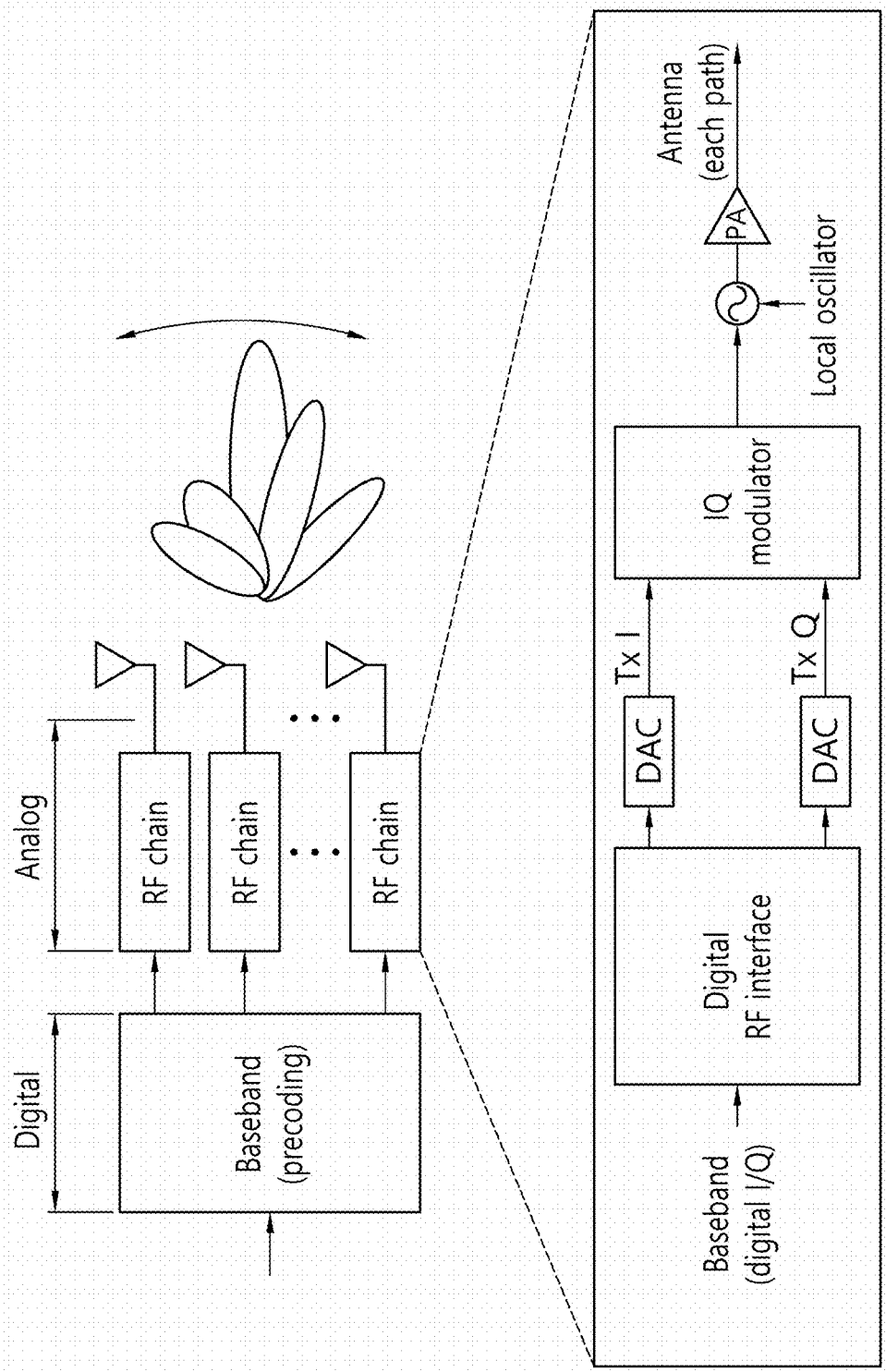
FIG. 4 is a block diagram of a transmitter including a digital beamformer and a RF chain.

FIG. 4 is a block diagram of a transmitter including a digital beamformer and a RF chain. In digital beamforming, as opposed to analog beamforming, a beam is formed in the digital stage by a baseband process, in order to maximize diversity and multiplexing gain in an MIMO environment. Referring to FIG. 4, a beam may be formed by performing precoding in the baseband process. The RF chains may include PAs. Hence, complex weights generated for beamforming may be applied directly to transmitted data. Digital beamforming may support simultaneous multi-user beamforming because a different beam may be formed for each user. Moreover, digital beamforming allows for forming an independent beam for each user to whom a resource is orthogonally allocated, thus providing high scheduling flexibility and enabling to operate the transmitting end according to a system purpose. In digital beamforming, when a technology such as MIMO-OFDM is used in a broadband transmission environment, an independent beam may be formed per subcarrier. Thus, digital beamforming may optimize the maximum data rate of a single user on the basis of increased system capacity and greater beam gain. Therefore, digital beamforming-based MIMO technology was adopted to 3G/4G systems.

Meanwhile, a massive MIMO environment with a significantly increased number of transmit-receive antennas may be considered. For a typical cellular system, it is assumed that up to 8 transmit-receive antennas are used in an MIMO environment, whereas scores or even hundreds of transmit-receive antennas may be used in a massive MIMO environment. When conventional digital beamforming is used in a massive MIMO environment, digital signal processing should be performed for hundreds of transmit antennas by a baseband process. This increases the complexity of signal processing considerably, and also increases the complexity of hardware implementation considerably since as many RF chains are needed as there are transmit antennas. Moreover, independent channel estimation is needed for every transmit antenna, and a frequency division duplex (FDD) system requires feedback information for massive MIMO channels of all antennas, thus considerably increasing pilot and feedback overhead. In contrast, when conventional analog beamforming is used in a massive MIMO environment, the hardware complexity at the transmitting end is relatively low, but the performance increase through the use of multiple antennas is only slight and the flexibility of resource allocation may be reduced. Especially in broadband transmission, it is very hard to perform beam control for each frequency.

Accordingly, massive MIMO environments require hybrid beamforming, a combination of analog beamforming and digital beamforming, rather than using either analog beamforming or digital beamforming as a beamforming technology. That is, a hybrid-type transmitting end structure may be needed so as to lower the complexity of hardware implementation at the transmitting end according to the characteristics of analog beamforming and to maximize beamforming gain using a large number of transmit antennas according to the characteristics of digital beamforming.

Hybrid beamforming will be described. As described above, the purpose of hybrid beamforming is to configure a transmitting end that provides the benefits of analog beamforming and the benefits of digital beamforming in a massive MIMO environment.

Figure 5:
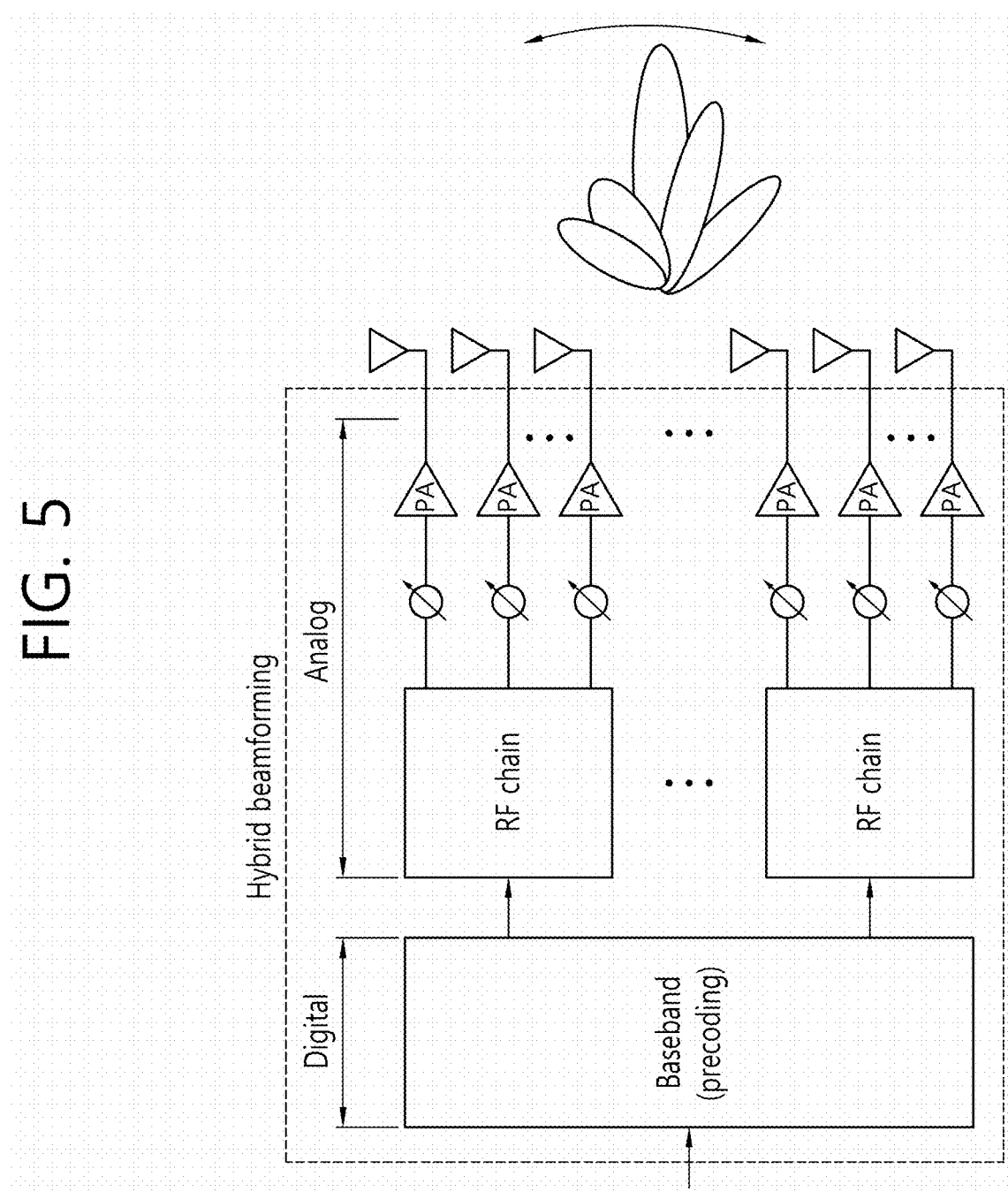
FIG. 5 is a block diagram of a transmitter including a hybrid beamformer.

FIG. 5 is a block diagram of a transmitter including a hybrid beamformer. Referring to FIG. 5, hybrid beamforming may basically allow for forming a coarse beam through analog beamforming and then a beam for multi-stream or multi-user transmission through digital beamforming. That is, hybrid beamforming exploits both analog beamforming and digital beamforming in order to lower the complexity of implementation at the transmitting end or hardware complexity.

A basic hybrid beamformer may have $N_t^{RF}$ individual transmit antennas for each RF chain. Thus, the relationship between the total number of transmit antennas and the number of transmit antennas per RF chain is expressed by $N_t = N_t^{RF} * N_{RF}$. $N_{RF}$ is the number of RF chains. Finally, signals that have passed through the PSs and PAs for each RF chain are sent independently to the transmit antennas. Equation 1 represents an example of a matrix operation-based system model of hybrid beamforming.

$$y_k = H_k F_k^{RF} F_k^{BB} s_k + z_k \qquad \text{<Equation 1>}$$

In Equation 1, $y_k$ is the received signal vector ($N_r*1$) at the kth subcarrier, $H_k$ is the $N_r*N_t$ channel at the kth subcarrier, $F^{RF}$ is the $N_t*N_{RF}$ RF precoder at all subcarriers (which is the same for all subcarriers), $F_k^{BB}$ is the $N_{RF}*N_s$ baseband precoder at the kth subcarrier (which may vary for each subcarrier), $s_k$ is the transmitted signal vector ($N_s*1$) at the kth subcarrier, and $z_k$ is the noise signal vector k ($N_r*1$) at the kth subcarrier. In addition, k is the subcarrier index (k=0, 1, 2, ..., $N_{FFT}$–1), $N_{FFT}$ is the size of fast Fourier transform (FFT), i.e. the total number of subcarriers, and $N_{RF}$ is the total number of RF chains. $N_t$ is the total number of antennas at the transmitting end, $N_t^{RF}$ is the number of transmit antennas for each RF chain, $N_r$ is the total number of antennas at the receiving end, and $N_s$ is the number of transmitted data streams.

For subcarrier k, the above Equation 1 can be solved and expanded as in Equation 2.

$$\begin{bmatrix} y^{(1)} \\ \vdots \\ y^{(Nr)} \end{bmatrix} = \begin{bmatrix} h_{11} & h_{12} & \cdots & h_{1Nt} \\ h_{21} & h_{22} & \cdots & h_{2Nt} \\ \vdots & \vdots & \ddots & \vdots \\ h_{Nr1} & h_{Nr2} & \cdots & h_{NrNt} \end{bmatrix} \quad \langle \text{Equation 2} \rangle$$

$$F^{RF} \left( \begin{bmatrix} v_{1,1} & v_{1,2} & \cdots & v_{N_{RF},N_S} \\ v_{2,1} & v_{2,2} & \cdots & v_{N_{RF},N_S} \\ \vdots & \vdots & \ddots & \vdots \\ v_{N_{RF},1} & v_{N_{RF},2} & \cdots & v_{N_{RF},N_S} \end{bmatrix} \begin{bmatrix} x^{(1)} \\ \vdots \\ x^{(N_S-1)} \end{bmatrix} \right) +$$

$$\begin{bmatrix} z^{(1)} \\ \vdots \\ z^{(Nr)} \end{bmatrix}$$

Moreover, an equivalent precoding matrix FRF of analog beamforming created by the PSs and PAs after the RF chain is represented by Equation 3.

$$F^{RF} = \begin{bmatrix} w^1_{N_t^{RF}} & 0 & 0 & \cdots & 0 \\ 0 & w^2_{N_t^{RF}} & 0 & \cdots & 0 \\ 0 & 0 & w^3_{N_t^{RF}} & \cdots & 0 \\ \vdots & \vdots & \vdots & \ddots & \vdots \\ 0 & 0 & 0 & \cdots & w^{N_{RF}}_{N_t^{RF}} \end{bmatrix} \quad \langle \text{Equation 3} \rangle$$

The precoding weight for each RF chain of $F^{RF}$ is represented by Equation 4.

$$w^j_{N_t^{RF}} = \begin{bmatrix} w^j_1 \\ w^j_2 \\ \vdots \\ w^j_{N_t^{RF}} \end{bmatrix} \quad \langle \text{Equation 4} \rangle$$

A hybrid beam radiation pattern for a uniform linear array (ULA) antenna will be described. The array response vector for the ULA antenna is represented by Equation 5.

$$a(\theta) = \quad \langle \text{Equation 5} \rangle$$
$$\begin{bmatrix} 1 & \exp\left(j2\pi \times 1 \times \frac{d}{\lambda}\sin(\theta)\right) & \exp\left(j2\pi \times 2 \times \frac{d}{\lambda}\sin(\theta)\right) & \cdots & \exp\left(j2\pi \times (N_t-1) \times \frac{d}{\lambda}\sin(\theta)\right) \end{bmatrix}^t$$

In Equation 5, λ is wavelength, and d is the distance between antennas. To illustrate an antenna radiation pattern of the hybrid beamformer, it is assumed below that there are four RF chains and there are four transmit antennas for each RF chain, for convenience of explanation.

Figure 6:
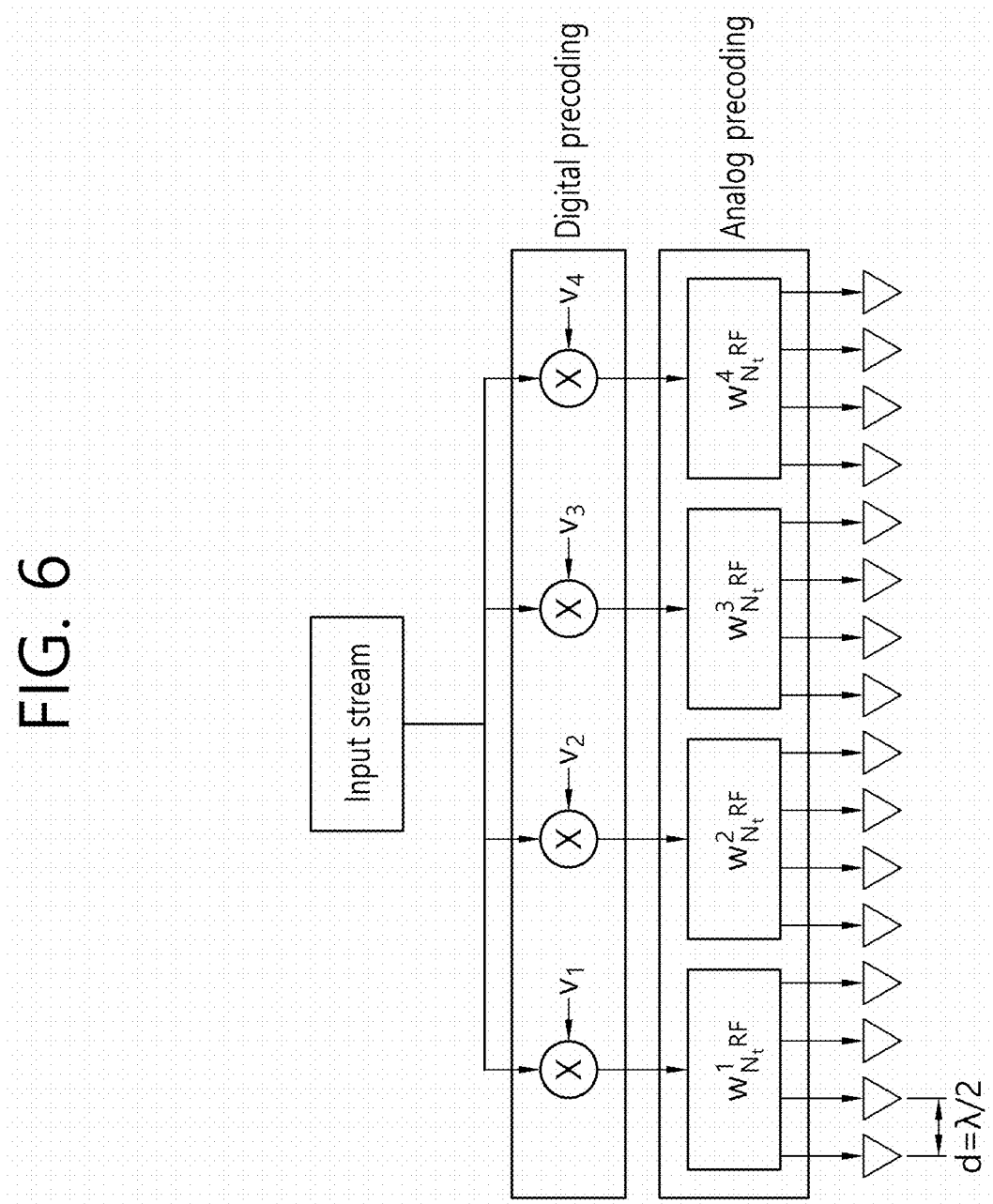
FIG. 6 shows an example of a 16 ULA antenna structure including 4 RF chains for hybrid beamforming.

FIG. 6 shows an example of a 16 ULA antenna structure including 4 RF chains for hybrid beamforming. It is assumed that d=λ/2. In this case, the equivalent precoding matrix $F^{RF}$ of analog beamforming is represented by Equation 6.

$$F^{RF} = \begin{bmatrix} w^1_{N_t^{RF}} & 0 & 0 & 0 \\ 0 & w^2_{N_t^{RF}} & 0 & 0 \\ 0 & 0 & w^3_{N_t^{RF}} & 0 \\ 0 & 0 & 0 & w^4_{N_t^{RF}} \end{bmatrix}, \quad \langle \text{Equation 6} \rangle$$

$$w^j_{N_t^{RF}} = \begin{bmatrix} w^j_1 \\ w^j_2 \\ w^j_3 \\ w^j_4 \end{bmatrix}$$

The beam shift angle can be set to 0° to obtain the beam pattern at the boresight. Thus, in an equivalent precoding matrix of analog beamforming, all elements of weight vectors may be 1.

Further, a random weight vector of rank 1 which is to be applied in digital beamforming may be defined by Equation 7.

$$F^{BB} = v_1 = [v_1 v_2 v_3 v_4]^T \quad \langle \text{Equation 7} \rangle$$

An overall antenna column response vector to which the analog beamforming of Equation 6 and the digital beamforming of Equation 7 are applied to the boresight (θ=0°) can be simply expressed as Equation 8. The response to each antenna column response can be expressed as the sum of all vector elements.

$$\sum a(\theta) = \quad \langle \text{Equation 8} \rangle$$
$$(1 + \exp(j\pi\sin(\theta)) + \exp(j\pi 2\sin(\theta)) + \exp(j\pi 3\sin(\theta))) \times$$
$$(v_1 + \exp(j\pi 4\sin(\theta)) \cdot v_2 +$$
$$\exp(j\pi 8\sin(\theta)) \cdot v_3 + \exp(j\pi 12\sin(\theta)) \cdot v_4) =$$
$$\left(\sum_{i=1}^{4} s_i\right) \times \left(\sum_{i=1}^{4} t_i\right) = \sum s \times \sum t$$

In Equation 8, s is a beam boundary vector and can be expressed by Equation 9. The beam boundary vector s determines the overall effective range of the hybrid beamforming, and the range of the digital beamforming is also limited to the corresponding range.

$$s = \begin{bmatrix} 1 \\ e^{j\pi \sin(\theta)} \\ e^{j\pi 2\sin(\theta)} \\ e^{j\pi 3\sin(\theta)} \end{bmatrix}$$ ⟨Equation 9⟩

In addition, in Equation 8, t is a beam gain and a steering vector, and can be expressed by Equation (10).

$$t = \begin{bmatrix} 1 & 0 & 0 & 0 \\ 0 & e^{j\pi 4\sin(\theta)} & 0 & 0 \\ 0 & 0 & e^{j\pi 8\sin(\theta)} & 0 \\ 0 & 0 & 0 & e^{j\pi 12\sin(\theta)} \end{bmatrix} \begin{bmatrix} v_1 \\ v_2 \\ v_3 \\ v_4 \end{bmatrix}$$ ⟨Equation 10⟩

Figure 7:
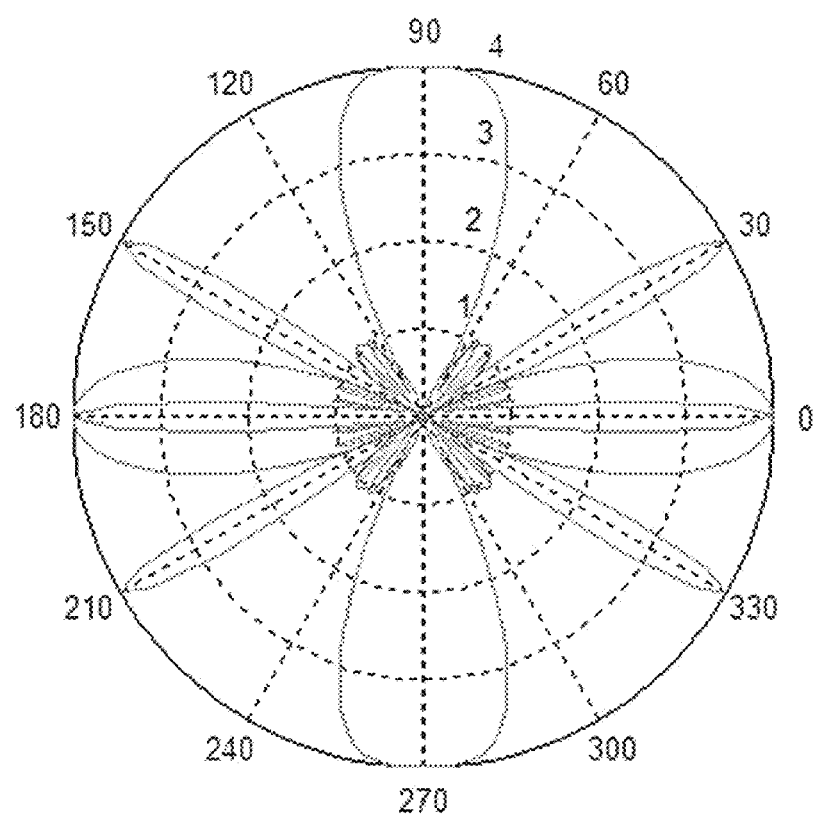
FIG. 7 shows an example of a beam pattern of the beam bound vector s, beam gain, and steering vector t.
Figure 8:
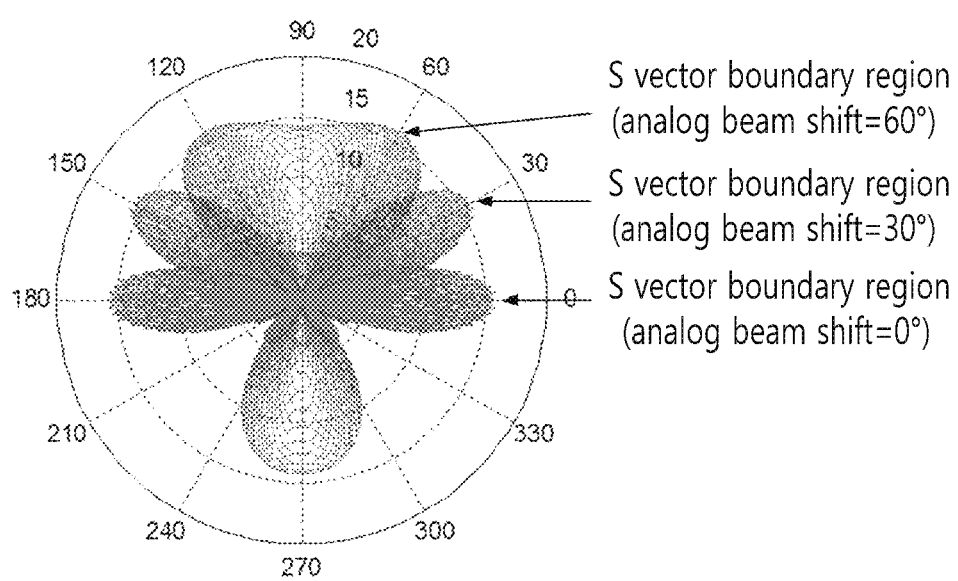
FIG. 8 shows an example of a final antenna array response according to analog beam shifts.

FIG. 7 shows an example of a beam pattern of the beam bound vector s, beam gain, and steering vector t. FIG. 8 shows an example of a final antenna array response according to analog beam shifts. That is, FIG. 8 is the resulting of cumulative beam pattern to which all weight vectors for determining digital beamforming are applied. Referring to FIG. 8, it can be seen that the range of an effective beam is limited by the beam bound vector s.

Technical issues with hybrid beamforming are as follows.

(1) Difficulties in optimizing analog/digital beamforming designs: While digital beamforming allows for forming individual beams for different users using the same time-frequency resource, analog beamforming is limited in that a common beam has to be formed using the same time-frequency resource. This limitation may cause issues like a limit on the largest possible number of ranks corresponding to the number of RF chains, the difficulty of subband beam control using an RF beamformer, and/or the difficulty of optimization of beamforming resolution/granularity.

(2) Need for a specific method of common signal transmission: In analog beamforming, which forms a beam only in a particular direction on the same time-frequency resource, it is not possible to form multiple beams simultaneously in the directions of all UEs. Thus, DL/UL control channels, reference signals, broadcast channels, synchronization signals, etc., may not be transmitted simultaneously to all UEs that may be distributed over all areas in a cell. There are also problems which occur when a UE transmits physical random access channel (PRACH), physical uplink control channel (PUCCH), and/or sounding RS (SRS) over UL.

(3) Need for the design of more pilots and feedback to determine an analog/digital beam: In the case of estimation for analog/digital beams, the digital beam may be estimated directly by using a conventional orthogonal pilot allocation scheme, whereas the analog beam requires as long a time-duration as the number of beam candidates. This means that the more time delay is needed for analog beam estimation, and this may cause a system loss. Moreover, simultaneously estimating both digital and analog beams may lead to a considerable increase in complexity.

(4) Difficulties in supporting analog beam-based spatial division multiple access (SDMA) and FDMA: Digital beamforming allows to freely form beams for multi-users/streams, whereas, in analog beamforming, the same beam is formed for the entire transmission band, making it difficult to form an independent beam per user or per stream. In particular, it is hard to support FDMA (e.g. OFDMA) through orthogonal frequency resource allocation, thus making the optimization of frequency resource efficiency impractical.

Among the technical issues of the hybrid beamforming described above, the present invention described below can provide a method for optimizing the analog/digital beam design for the hybrid beamforming.

As described above, when beamforming is performed by using multiple antennas is performed, the signal quality is increased at the receiving end. In general, gain of the directional beamforming is expressed by Equation 11.

$$G_{dBi} = 10 \cdot \log_{10}(N_{tx})$$ <Equation 11>

Referring to Equation 11, the gain of directional beamforming is increased in log-scale in proportion to the number $N_{tx}$ of antennas. However, as the number of antennas increases and the beam gain increases, the beam broadness decreases and the shape of the beam becomes sharp. The relationship between the number of antennas and the beam broadness is expressed by Equation 12.

$$\Delta \theta_{3dB} = \alpha \frac{\lambda}{Nd}$$ ⟨Equation 12⟩

Referring to Equation 12, 3 dB beam broadness is proportional to the wavelength length λ, and is inversely proportional to the number N of antennas and the distance d between antennas. That is, as the number of antennas increases, the 3 dB beam broadness decreases, and accordingly, the area covered by one beam also decreases. For the 3 dB beam broadness, the weight is generally α=0.886. However, when various beam broadness broadening techniques are applied, the 3 dB beam broadness may be variable.

That is, as the number of antennas increases, the beam gain increases but the beam broadness decreases. On the other hand, when the beam broadness increases, the range and angle of the region where one beam is served becomes wider, but the beam gain in the corresponding region decreases. That is, the beam gain and the beam broadness are in a trade-off relationship with each other. As the beam broadness increases, the entire service area can be serviced with a relatively small number of beams, which has merits that operational complexity is reduced, but the beam gain decreases, which has demerits that quality of the received signal is decreased in the corresponding service area. On the other hand, as the beam broadness decreases, the entire service area should be serviced with a relatively large number of beams, which increases the operational complexity, but, the beam gain increases, which has merits that the quality of the received signal increases in the corresponding service area.

Figure 9:
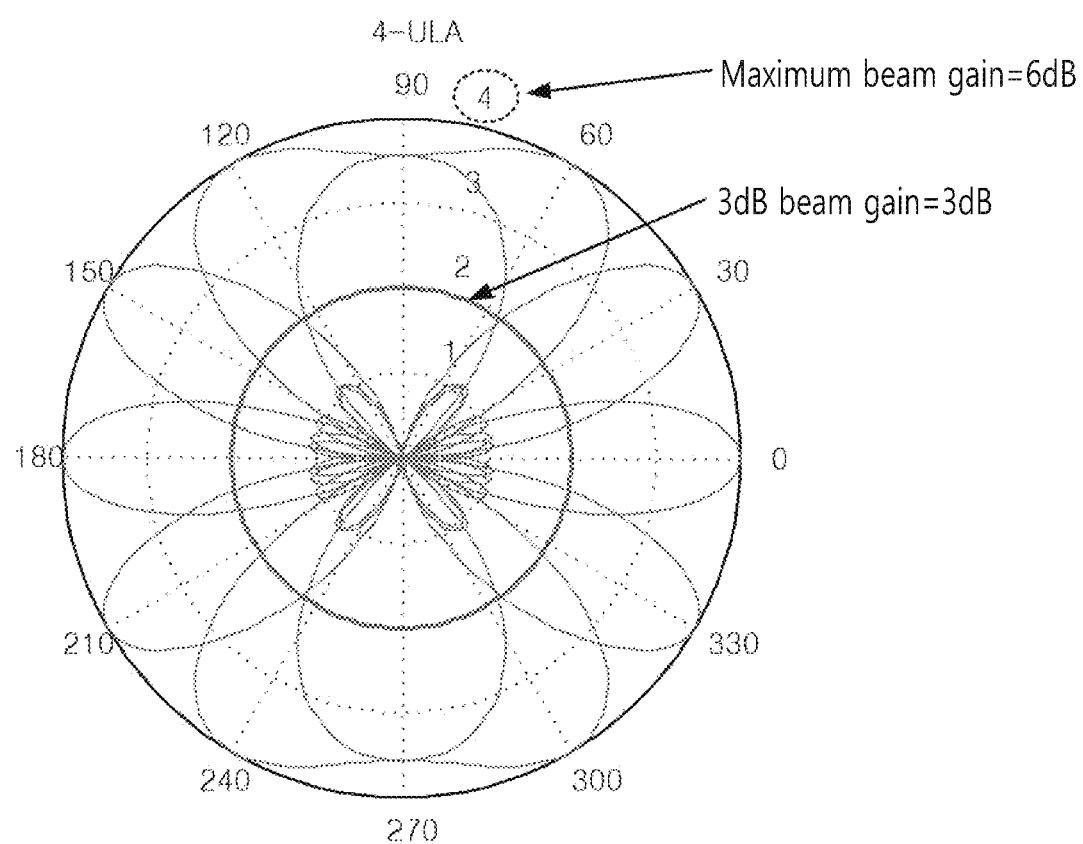
FIG. 9 shows the beam gain and beam broadness when four ULA antennas are used.

FIG. 9 shows the beam gain and beam broadness when four ULA antennas are used. Referring to FIG. 9, when performing hybrid beamforming by using four ULA antennas, the maximum beam gain is 6 dB, and about five beams are required to cover the area in the range of −60° to 60°. In this case, the beam gain and the 3 dB beam broadness can be expressed by Equation 13. Here, the distance between antennas is defined as d=λ/2.

$$G_{dBi} = 10 \cdot \log_{10}(N_{tx}) = 6 \text{ dBi}$$ ⟨Equation 13⟩

$$\Delta\theta_{3dB} = 0.886 \frac{\lambda}{Nd} = 0.886 \frac{\lambda}{(N_{tx} - 1) \cdot d} = 33.8°$$

Figure 10:
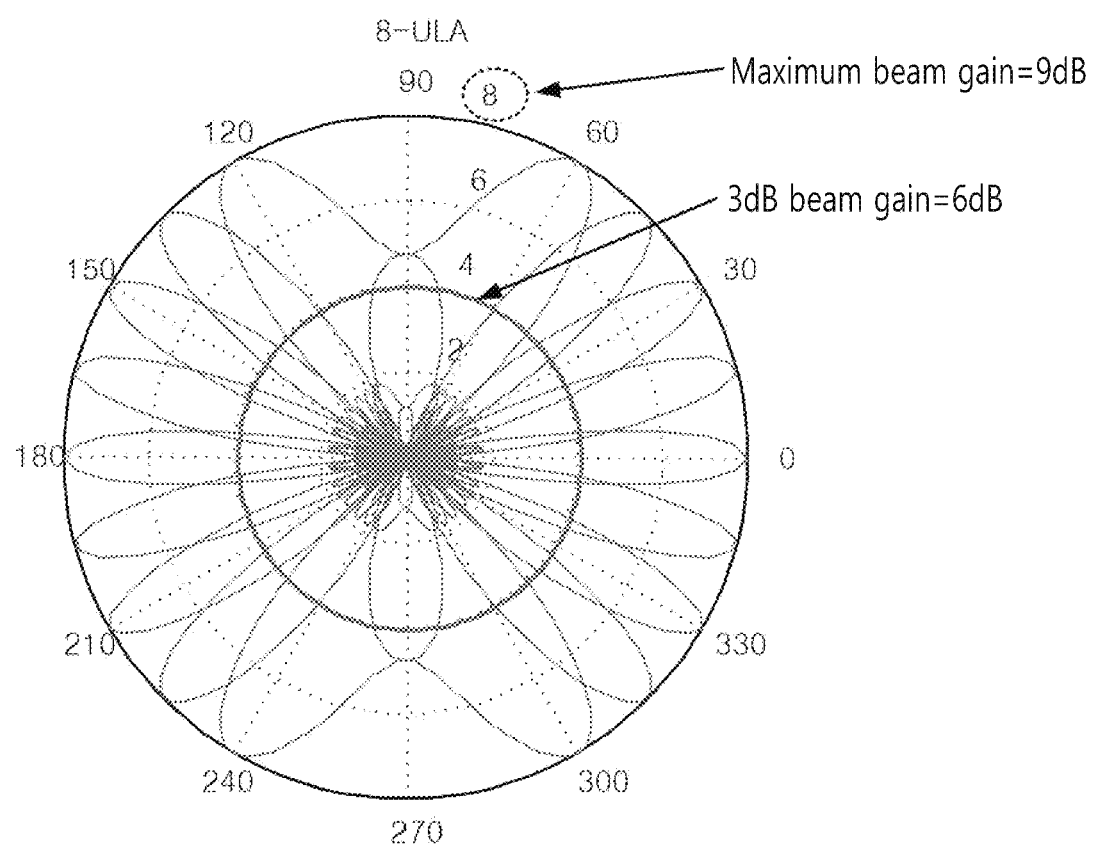
FIG. 10 shows the beam gain and the beam broadness when eight ULA antennas are used.

FIG. 10 shows the beam gain and the beam broadness when eight ULA antennas are used. Referring to FIG. 10, when performing hybrid beamforming by using eight ULA antennas, the maximum beam gain is 9 dB, and about nine beams are required to cover the area in the range of −60° to 60°. In this case, the beam gain and the 3 dB beam broadness can be expressed by Equation 14. Here, the distance between antennas is defined as d=λ/2.

$$G_{dBi} = 10 \cdot \log_{10}(N_{tx}) = 9 \text{ dBi} \quad \langle\text{Equation 14}\rangle$$

$$\Delta\theta_{3dB} = 0.886 \frac{\lambda}{Nd} = 0.886 \frac{\lambda}{(N_{tx} - 1) \cdot d} = 14.5°$$

Figure 11:
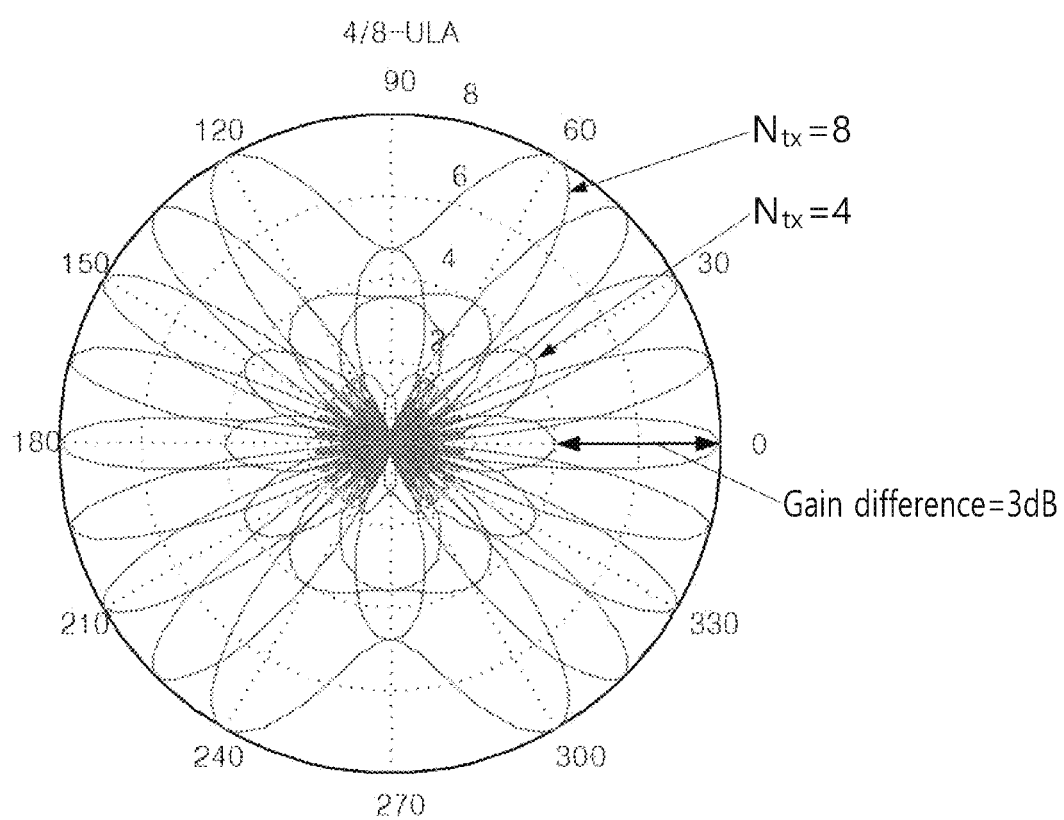
FIG. 11 shows a comparison between the beam gain and the beam broadness when four ULA antennas are used and eight ULA antennas are used.

FIG. 11 shows a comparison between the beam gain and the beam broadness when four ULA antennas are used and eight ULA antennas are used. That is, FIG. 11 is a view in which FIG. 9 and FIG. 10 are superimposed. Referring to FIG. 11, when eight ULA antennas are used, the maximum beam gain is increased by 3 dB as compared with when four ULA antennas are used, but four beams are additionally required to cover the range of −60° to 60°.

When the base station performs beamforming by using a relatively small number of transmit antennas, the number of beams to be searched for by the UE decreases and thus the overhead of the beam search is reduced, which is more advantageous for beam scanning and synchronization acquisition. However, since the beam gain is reduced as compared with the case where the base station performs beamforming by using a relatively large number of transmit antennas, the cell coverage (i.e. the maximum cell radius) decreases accordingly. That is, when the UE receives a synchronization signal for synchronization acquisition, there is a trade-off relationship between a beam broadness and a signal quality based on the number of transmit antennas of the base station, and when the beam broadness increases, problem that the UE cannot stably receive the synchronization signal according to a location of the UE may occur.

In order to solve the above mentioned problems, the present invention proposes a new synchronization signal design method based on repeated transmission in consideration of the beam broadness. More specifically, in consideration of a trade-off relationship between the beam broadness and the signal quality according to the number of transmit antennas of the base station, the present invention defines a repetition pattern of the synchronization signal such that all UEs in a cell can receive the synchronization signal with uniform signal quality. Accordingly, all UEs in the cell can stably detect the synchronization signal.

First, a method for determining a repetition number and/or pattern of a downlink synchronization signal based on a variation of a beam broadness, according to an embodiment of the present invention, will be described. That is, the base station may determine the repetition number and/or pattern of the synchronization signal based on the beam broadness and/or the beam gain to be varied according to the number of antennas, and transmit the synchronization signal through beamforming by using multiple antennas based on the determined number of repetitions and/or patterns. The UE accumulates the repeatedly received synchronization signal to perform detection. That is, the synchronization signal having a low beam gain and a large beam broadness is transmitted in accordance with the repetition number and/or pattern determined by the base station, thereby ensuring the synchronization signal detection performance of the UE.

Figure 12:
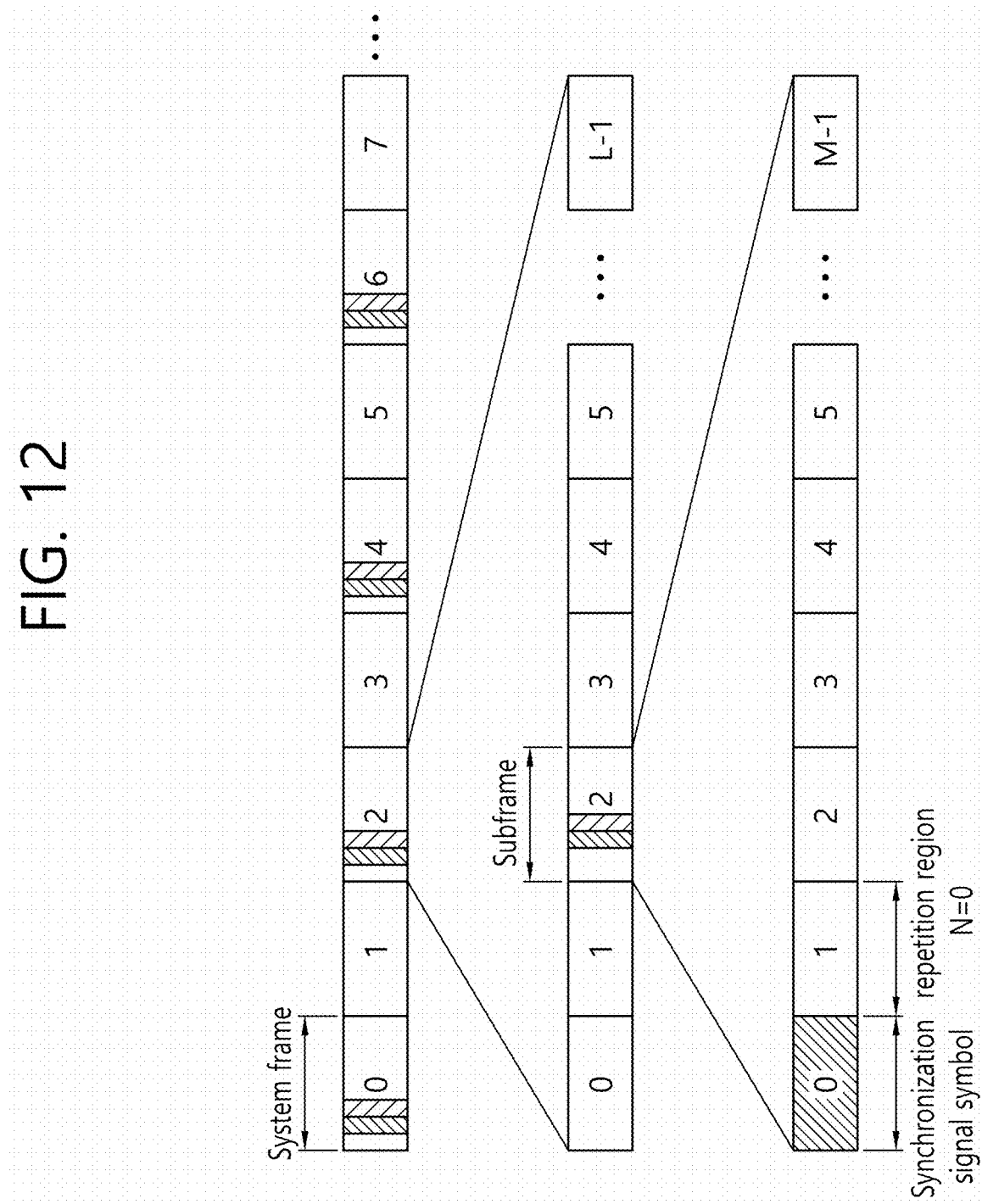
FIG. 12 shows an example of repeated transmission of a beamforming-based synchronization signal by using eight antennas according to an embodiment of the present invention.

FIG. 12 shows an example of repeated transmission of a beamforming-based synchronization signal by using eight ULA antennas according to an embodiment of the present invention. It is assumed that the synchronization signal is periodically transmitted in a specific subframe. As described above, the beamforming using the eight ULA antennas has a beam gain larger by 3 dB than the beamforming using the four ULA antennas. Thus, a base station using eight ULA antennas may transmit the synchronization signal without repeated transmission. That is, in this case, the synchronization signal is not repeatedly transmitted in the repeated region within the subframe.

Figure 13:
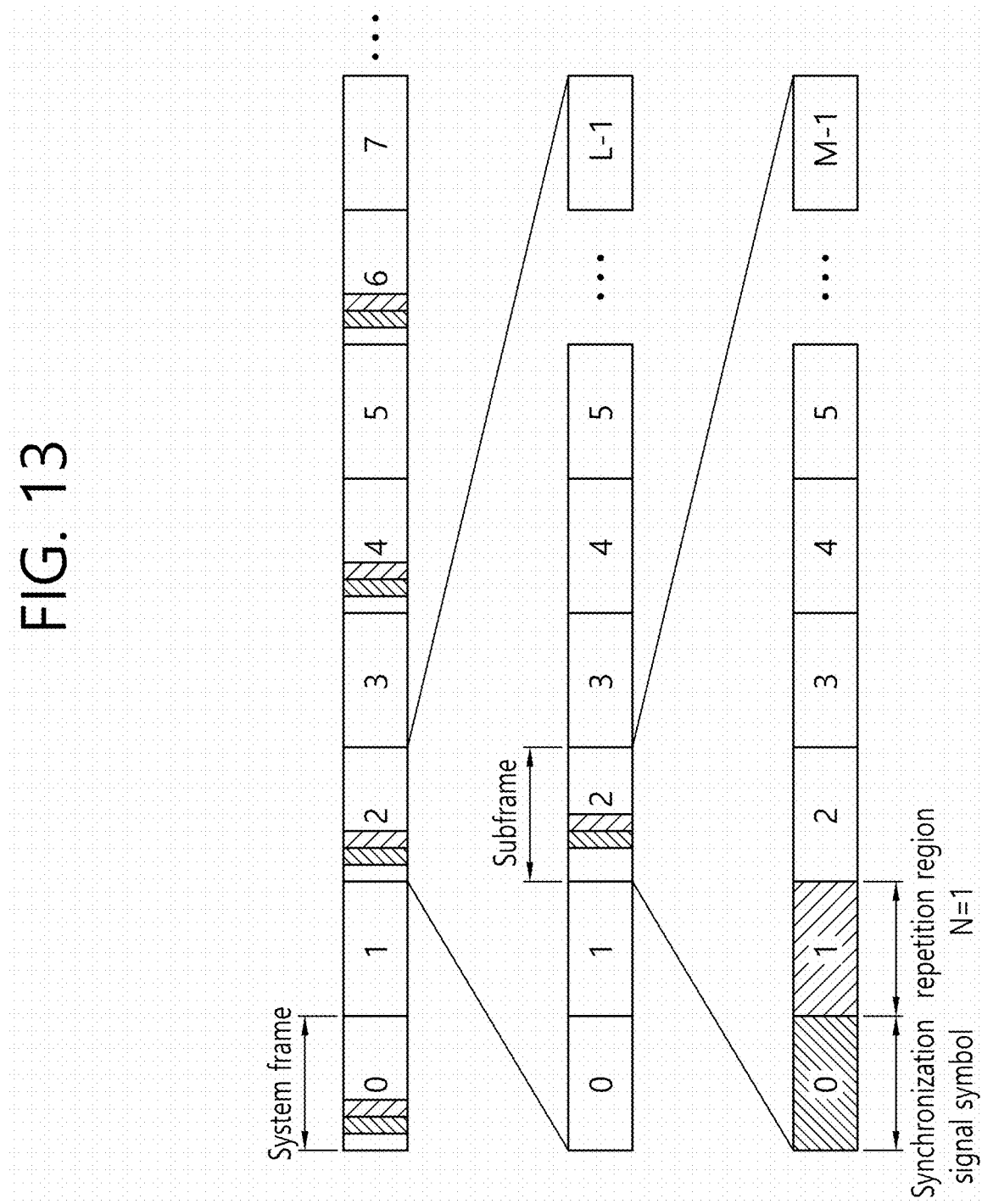
FIG. 13 shows an example of repeated transmission of a beamforming-based synchronization signal using four antennas according to an embodiment of the present invention.

FIG. 13 shows an example of repeated transmission of a beamforming-based synchronization signal using four antennas according to an embodiment of the present invention. As described above, the beamforming using the four ULA antennas has a beam gain smaller by 3 dB than the beamforming using the eight ULA antennas. An additional beam gain of 3 dB is required for the UE to receive stably the synchronization signal. Thus, a base station using four ULA antennas may transmit the synchronization signal twice. That is, the synchronization signal is transmitted once in the original synchronization symbol within the subframe, and repeatedly transmitted once in the repeated region.

The number of repetitions and/or repetition patterns of the synchronization signal to support the maximum coverage of the cell may be determined when the beam gain of the synchronization signal is being fixed. For example, when the beam broadness increasing technique is not considered, it may be considered that the beam gain of the base station is fixed to $G_{tx}$ 18.38 dB ($N_{tx}$=64). In this case, since the reception complexity of the UE increases, the number of beams to support the entire service area is not considered. That is, when the beam gain of the synchronization signal is fixed, the number of repetitions and/or repetition patterns of the synchronization signal may be determined such that quality of the received signal (e.g. reception SNR) is greater than or equal to a specific threshold value, in consideration of the link budget of the UE receiving the synchronization signal.

For example, system parameters for design of the synchronization signal as shown in Table 1 may be assumed. Assuming that the UE is located at a cell boundary 500 m away from the cell center, it is assumed that the minimum SNR at which the UE can stably detect the synchronization signal is −5 dB.

TABLE 1

| Link Budget Analysis Value | Value |
| --- | --- |
| Transmit Power (dBm) ($P_{tx}$) | 40.00 |
| Transmit Antenna Gain (dBi) ($G_{tx}$) | 18.38 |
| Cable loss (dB) ($L_{cable}$) | 1.00 |
| Receive Antenna Gain (dB) ($G_{rx}$) | 3.00 |
| EIRP (dm) (EIRP) | 60.38 |
| Carrier Frequency (GHz) ($f_c$) | 28.00 |
| Distance (km) (d) | 0.50 |
| Free space propagation loss (dB) | 148 |
| Other losses | 11.00 |
| Received Power (dBm) (P(d)) | −98.37 |
| Bandwidth (MHz) | 69.12 |
| Thermal Noise PSD (dBm/Hz) | −174.00 |
| Noise Figure (dB) ($N_0$) | 8.00 |

TABLE 1-continued

| Link Budget Analysis Value | Value |
| --- | --- |
| Thermal Noise (dBm) ($N_f$) | −87.60 |
| No BF SNR (dB) | −10.77 |
| Targeted 5% tile SINR SINR (dB) | −5 |
| Required Beamforming gain (dB) | 8.77 |

When the system parameters of Table 1 are used, the received SNR of the UE may be calculated by Equation 15.

$$\frac{E_s}{N_0} = \quad \langle\text{Equation 15}\rangle$$

$$P(d) - N_f - N_0(\text{dB}) = -98.37 + 95.6 - 8 = -10.77 \text{ dB}$$

$$\begin{cases} P(d) = EIRP - PL(d) = 60.38 - 158.75 = -98.37 \text{ dBm} \\ EIRP = P_{tx} + G_{tx} + G_{rx} - L_{cable} = 10 + 18.38 + 3 - 1 = 60.38 \text{ dbm} \\ PL(d) = 128.44 + 20\log_{10}(f_c) + 32\log_{10}(d) + L_{other} \\ = 128.44 + 20\log_{10}(9 \text{ GHz}) + 32\log_{10}(0.5 \text{ km}) + 11 = 158.75 \text{ dBm} \end{cases}$$

Referring to Equation 15, when the base station is fixed at a beam gain $G_{tx}=18.38$ dB ($N_{tx}=64$), the receiving SNR of the UE at a cell boundary 500 m away from the cell center is approximately −11 dB. Since the minimum SNR at which the UE can stably detect the synchronization signal is assumed to be −5 dB, an additional beam gain of 6 dB is required for the synchronization signal.

Figure 14:
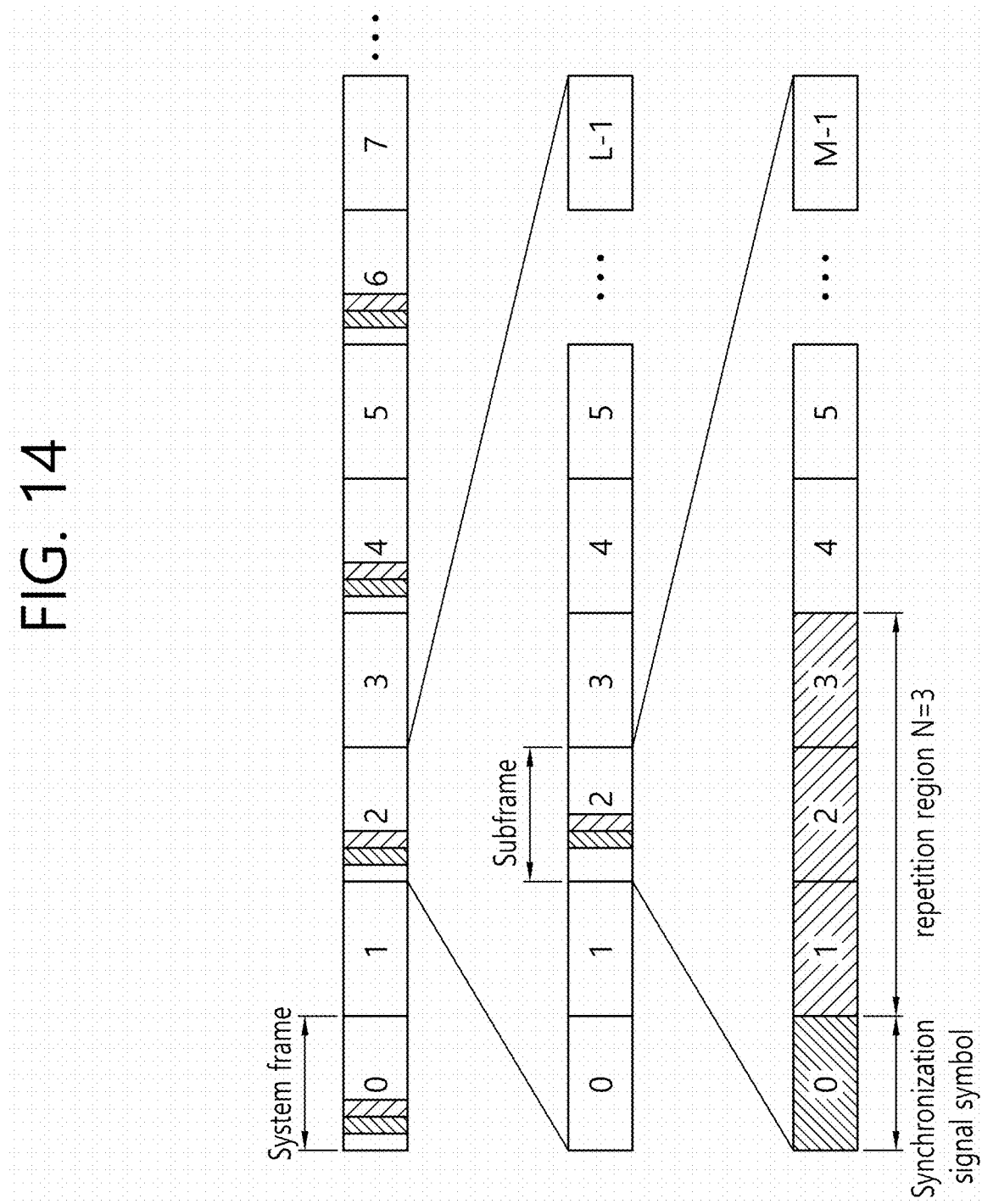
FIG. 14 shows an example of repeated transmission of a synchronization signal in order to obtain an additional beam gain of 6 dB according to an embodiment of the present invention.

FIG. 14 shows an example of repeated transmission of a synchronization signal in order to obtain an additional beam gain of 6 dB according to an embodiment of the present invention. The base station may repeatedly transmit the synchronization signal four times to obtain an additional beam gain of 6 dB. That is, the synchronization signal is transmitted once in the original synchronization symbol in the subframe, and repeatedly transmitted three times in the repeated region. Accordingly, the UE can stably receive the synchronization signal.

Alternatively, the number of repetitions and/or repetition patterns of the synchronization signal for supporting the maximum coverage of the cell may be determined in a state where the maximum number of repetitions of beam search of the UE is fixed. The number of repetitions that the UE searches for the beam may be limited in consideration of the complexity of the detection of the synchronization signal of the UE. For example, it is assumed that the width of the 3 dB beam is fixed with 15° and the service area of 60° is serviced only through four beams. In addition, it is assumed that the beam gain $G_{tx}$ of the base station is 15.38 dB ($N_{tx}=32$), the system parameters in Table 1 are used, and the UE is located at a cell boundary 500 m away from the cell center. In this case, it is assumed that the minimum SNR that can be detected is −5 dB. In this case, the receiving SNR of the UE may be calculated by Equation 16.

$$\frac{E_s}{N_0} = \quad \langle\text{Equation 16}\rangle$$

$$P(d) - N_f - N_0(\text{dB}) = -101.37 + 95.6 - 8 = -13.77 \text{ dB}$$

Referring to Equation 16, when the maximum number of beam search of the UE is fixed to 4, the receiving SNR of the UE located at a cell boundary 500 m away from the cell center is approximately −14 dB. This is a further reduced value of 3 dB than the receiving SNR of the UE calculated in Equation 15. Since the minimum SNR at which the UE can stably detect the synchronization signal is assumed to be −5 dB, an additional beam gain of 9 dB is required for the synchronization signal.

Figure 15:
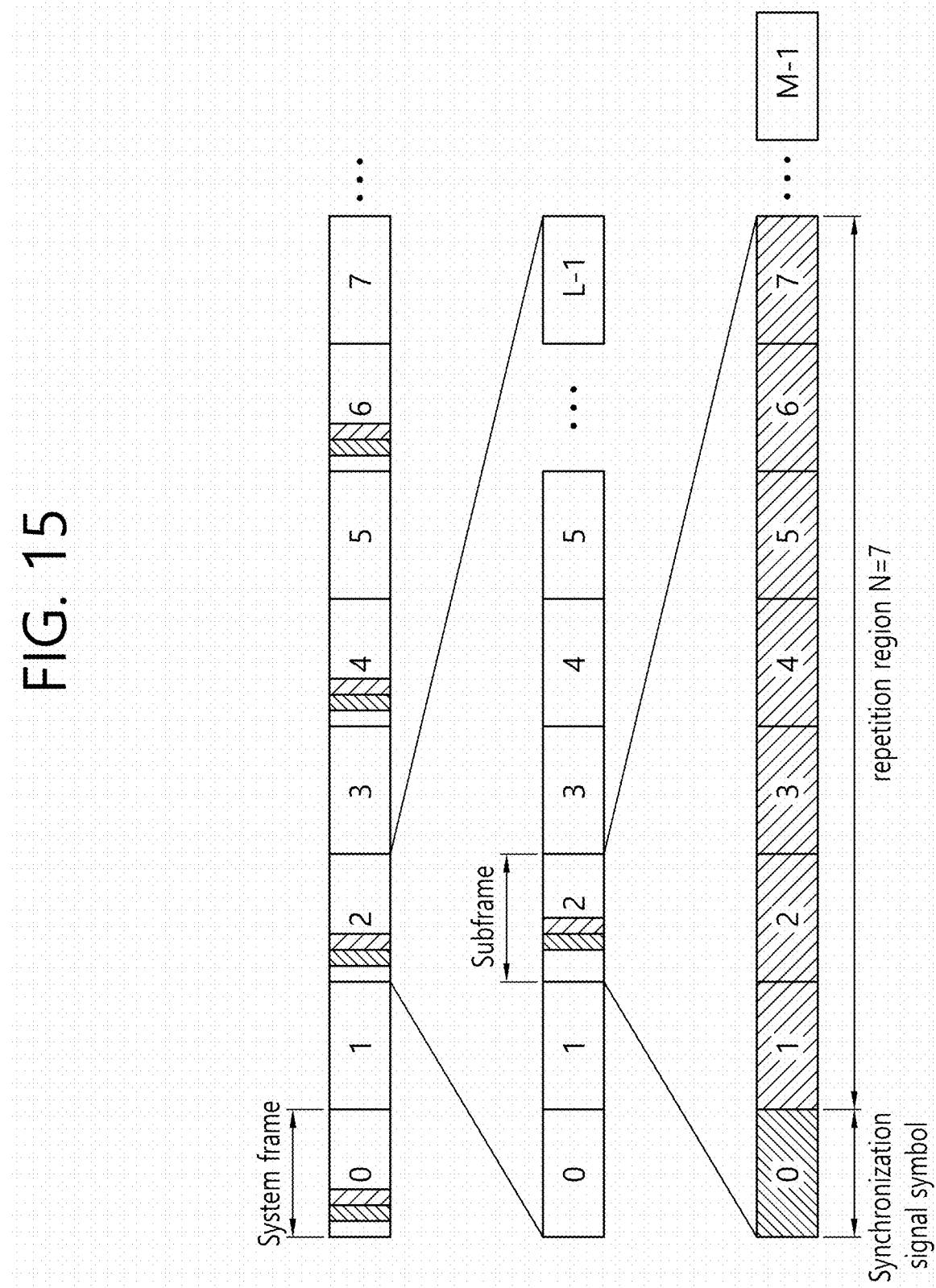
FIG. 15 shows an example of repetitive transmission of the synchronization signal in order to obtain an additional beam gain of 9 dB according to an embodiment of the present invention.

FIG. 15 shows an example of repetitive transmission of the synchronization signal in order to obtain an additional beam gain of 9 dB according to an embodiment of the present invention. In the embodiment of FIG. 15, an additional beam gain of twice as much as that of the embodiment of FIG. 14 is required. Thus, the base station may repeatedly transmit the synchronization signal eight times to obtain an additional beam gain of 9 dB. That is, the synchronization signal is transmitted once in the original sync symbol in the subframe, and repeatedly transmitted seven times in the repeated region. Accordingly, the UE can stably receive the synchronization signal.

Hereinafter, a method of simultaneously configuring, by the base station on a system frame, two or more different types of synchronization signals, in which repetition patterns are different from each other, according to an embodiment of the present invention, will be described. According to detection type in the synchronization signal of the UE, the base station may determine the position of each UE in the cell. For example, depending on the detection type in synchronization signal of the UE, the base station determines whether the UE is positioned in the cell center or in the inner-cell or in the outer-cell, and then may group the UEs. The UE may feed the detection type in the synchronization signal back to the base station. According to the grouping of the UEs, the base station can secure the flexibility and accuracy of scheduling for the UE when operating in the millimeter waveband.

Figure 16:
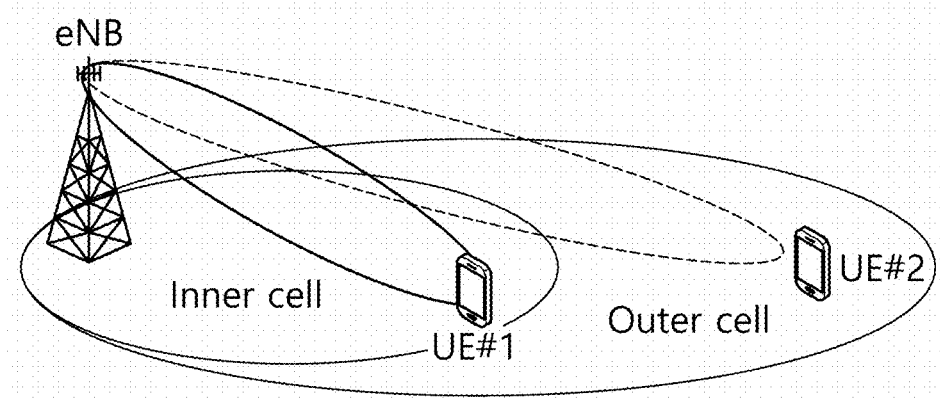
FIG. 16 shows an example of dividing a cell into an inner area and an outer area according to an embodiment of the present invention.

FIG. 16 shows an example of dividing a cell into an inner area and an outer area according to an embodiment of the present invention. The base station may divide the cell into the inner area and the outer area based on a boundary of the entire coverage of the cell. The beam gain may be set for each of the inner area and the outer area, and differences in beam gain in each area may be set to 3 dB or 6 dB or the like.

The base station may simultaneously configure synchronization signals having different repetition patterns on the system frame according to the beam gains of the divided cells. For example, the base station may simultaneously configure a first type synchronization signal, which is a synchronization signal corresponding to an inner cell, and a second type synchronization signal, which is a synchronization signal corresponding to an outer cell, on a system frame. If it is assumed that differences between the beam gain of the first type synchronization signal corresponding to the inner cell and the beam gain of the second type synchronization signal corresponding to the outer cell is 6 dB, then the second type synchronization signal should be additionally transmitted four times to compensate for differences in beam gain. Thus, the first type synchronization signal may be transmitted without repetition and the second type synchronization signal may be transmitted to be repeated four times.

Figure 17:
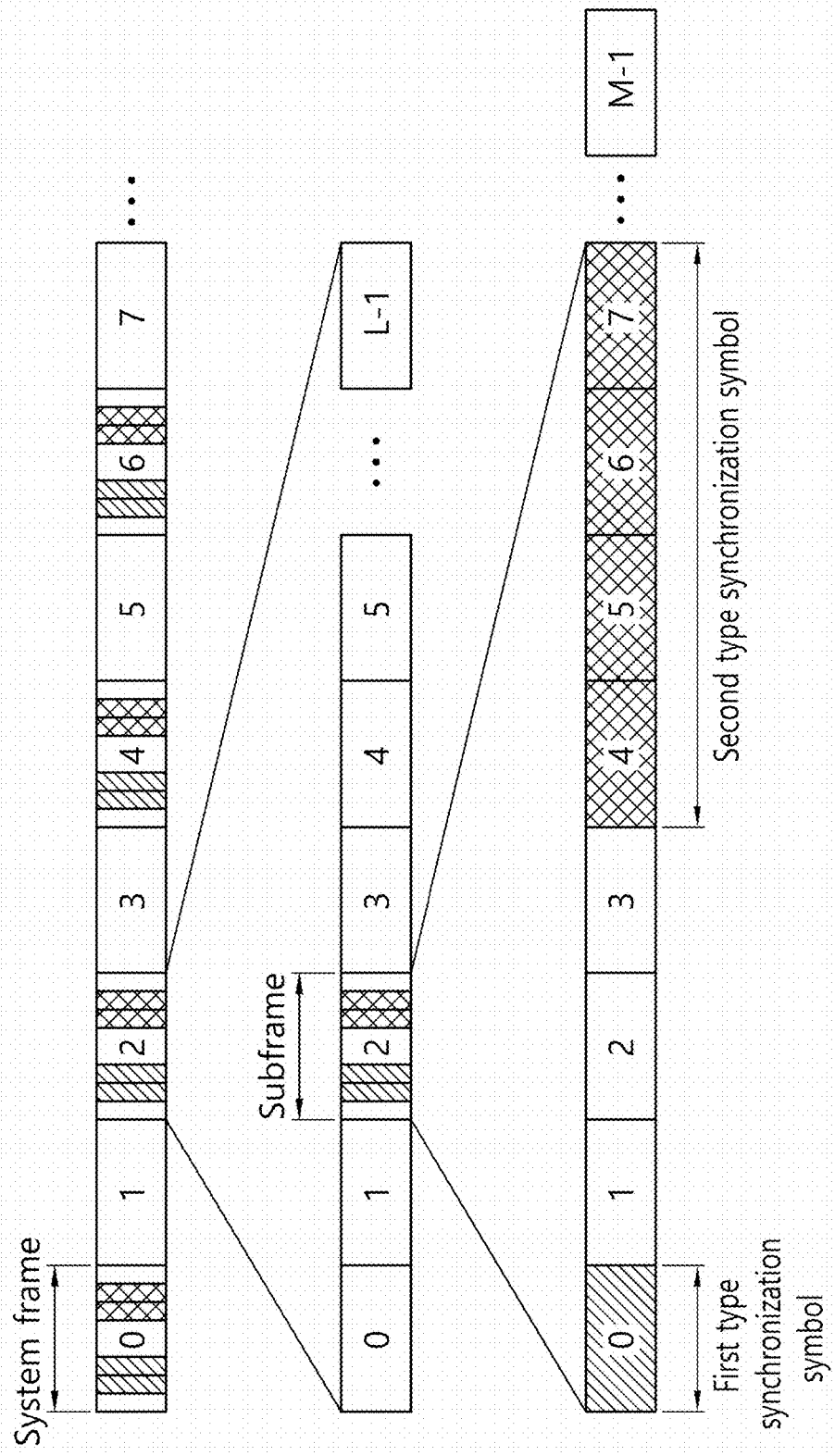
FIG. 17 shows an example of repeatedly transmitting two different types of synchronization signals through different repetition patterns according to an embodiment of the present invention.

FIG. 17 shows an example of repeatedly transmitting two different types of synchronization signals through different repetition patterns according to an embodiment of the present invention. Referring to FIG. 17, a first type synchronization signal and a second type synchronization signal having different repetition patterns are configured in the same subframe. The first type synchronization signal is transmitted without repetition, and the second type synchronization signal is transmitted to be repeated four times to obtain an additional beam gain of 6 dB.

Figure 18:
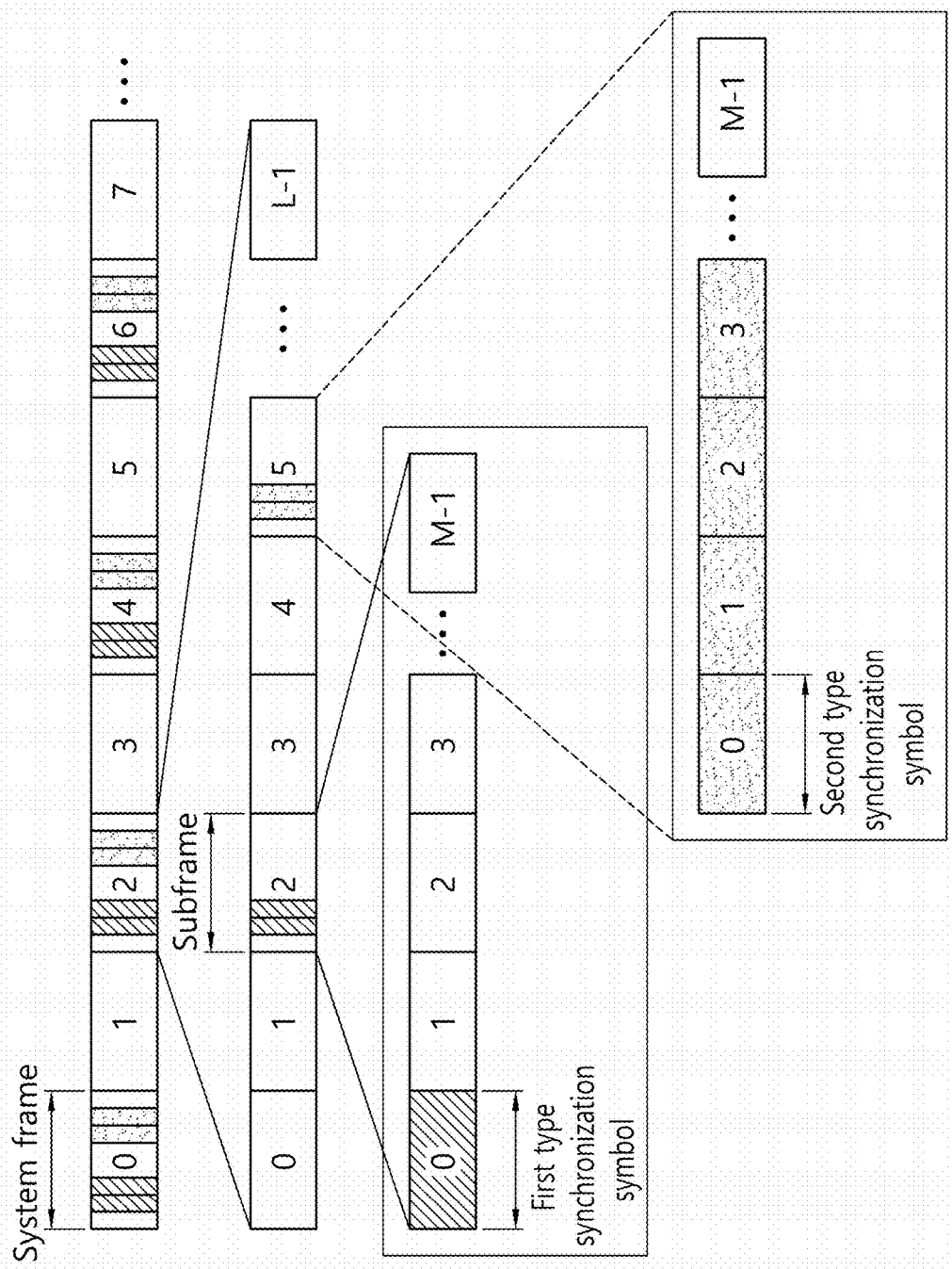
FIG. 18 shows another example of repetitively transmitting two different types of synchronization signals through different repetition patterns according to an embodiment of the present invention.

FIG. 18 shows another example of repetitively transmitting two different types of synchronization signals through different repetition patterns according to an embodiment of the present invention. Referring to FIG. 18, a first type synchronization signal and a second type synchronization signal having different repetition patterns are configured in different subframes. The first type synchronization signal is transmitted without repetition, and the second type synchronization signal is transmitted to be repeated four times to obtain an additional beam gain of 6 dB.

If the base station divides a cell into multiple sectors, and transmits multiple types of synchronization signals, which respectively correspond to the multiple sectors and have different repetition patterns, then the UE performs all detections of multiple types of synchronization signals. The timing offset $m_N$ of the N-th type synchronization signal may be calculated by Equation 17.

$$m_N = \underset{m}{\mathrm{argmax}} \left| \sum_{j=0}^{J_N-1} \sum_{i=0}^{L-1} Y[L \cdot j + i + m] S_N^*[i] \right|^2 \quad \langle \text{Equation 17} \rangle$$

In Equation 17, i represents a time index, L represents the total length of the synchronization signal (or length of the OFDM symbol) on a time axis, $J_N$ represents the total number of symbols of Nth type synchronization signal, Y[i] represents a signal received at time i, and $S_N[i]$ represents the Nth type synchronization signal transmitted at time i.

Based on Equation 17, the timing offset of the first type synchronization signal described in FIG. 17 or FIG. 18 may be calculated as Equation 18. It is assumed that the first type synchronization signal is a synchronization signal composed of one OFDM symbol.

$$m_1 = \underset{m}{\mathrm{argmax}} \left| \sum_{i=0}^{L-1} Y[i+m] S_1^*[i] \right|^2 > P_{Threhold} \quad \langle \text{Equation 18} \rangle$$

Further, based on Equation 17, the timing offset of the second type synchronizing signal described in FIG. 17 or FIG. 18 may be calculated as Equation 19. It is assumed that the second type synchronization signal is a synchronization signal composed of four OFDM symbols.

$$m_2 = \underset{m}{\mathrm{argmax}} \left| \sum_{j=0}^{3} \sum_{i=0}^{L-1} Y[L \cdot j + i + m] S_2^*[i] \right|^2 > P_{Threhold} \quad \langle \text{Equation 19} \rangle$$

The UE that has performed detection of the synchronization signal may obtain at least one of the timing offsets $m_1$ and $m_2$ of the first type synchronization signal and the second type synchronization signal having the received power equal to or greater than the specific reference value $P_{Threshold}$. In this case, depending on the position of the UE in the cell, the UE may obtain one or two timing offsets. For example, UE #1 positioned in the inner area of the cell in FIG. 16 may detect both the first type synchronization signal and the second type synchronizing signal, and thus two timing offsets $m_1$ and $m_2$ may be obtained. In addition, since UE #2 positioned in the outer region of the cell may detect only the second type synchronization signal repeatedly transmitted, and thus only one timing offset $m_2$ may be obtained.

The UE may feed the detection type of the synchronization signal back to the base station. In this case, a 1-bit signaling may be used. In addition, the UE may synchronize with the cell in accordance with the synchronization signal having the smallest value of the received power exceeding the specific reference value, among the detected multiple types of synchronization signals. This is to support distribution of appropriate UEs in the cell. Alternatively, the UE may synchronize with the cell in accordance with the synchronization signal having the largest value of the received power exceeding the specific reference value, among the detected multiple types of synchronization signals. This is to perform synchronization depending on a link quality.

Figure 19:
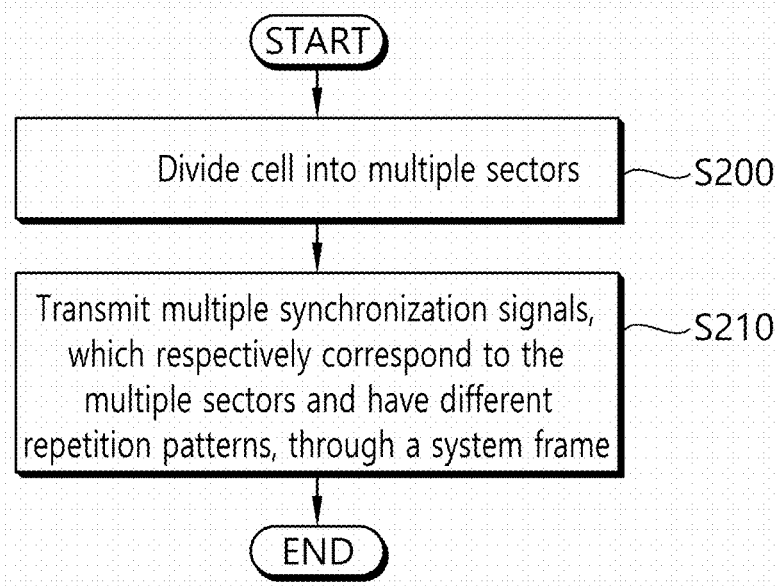
FIG. 19 shows a method for transmitting a synchronization signal based on a repetition pattern by a base station according to an embodiment of the present invention.

FIG. 19 shows a method for transmitting a synchronization signal based on a repetition pattern by a base station according to an embodiment of the present invention.

In step S100, the base station divides a cell into multiple sectors. The multiple sectors may include a cell center area and a cell boundary area. Alternatively, the multiple sectors may include a cell inner area and a cell outer area. A beam gain may be set for each of the multiple sectors, and a difference in beam gain for each area may be set.

In step S110, the base station transmits multiple types of synchronization signals, which respectively correspond to the multiple sectors and have different repetition patterns, to a UE through a system frame. The different repetition patterns may be configured based on distances between the base station and each of the multiple sectors. The different repetition patterns may correspond to different number of repetitions of multiple types of synchronization signals based on the distances between the base station and the multiple sectors. The number of repetitions of the synchronization signal corresponding to the sector that is farther from the base station may be greater than the number of repetitions of the synchronization signal corresponding to the sector that is closer to the base station. For example, the number of repetitions of the synchronization signal for an outer area of the cell may be greater than the number of repetitions of the synchronization signal for an inner area of the cell. The number of repetitions may be determined based on a difference in beam gain of each of the multiple sectors according to a distance from the base station.

In addition, the multiple types of synchronization signals may be transmitted through the same subframe in the system frame. Alternatively, the multiple types of synchronization signals may be transmitted through different subframes in the system frame.

The base station may receive feedback on a result in detection of the synchronization signal from the UE.

Figure 20:
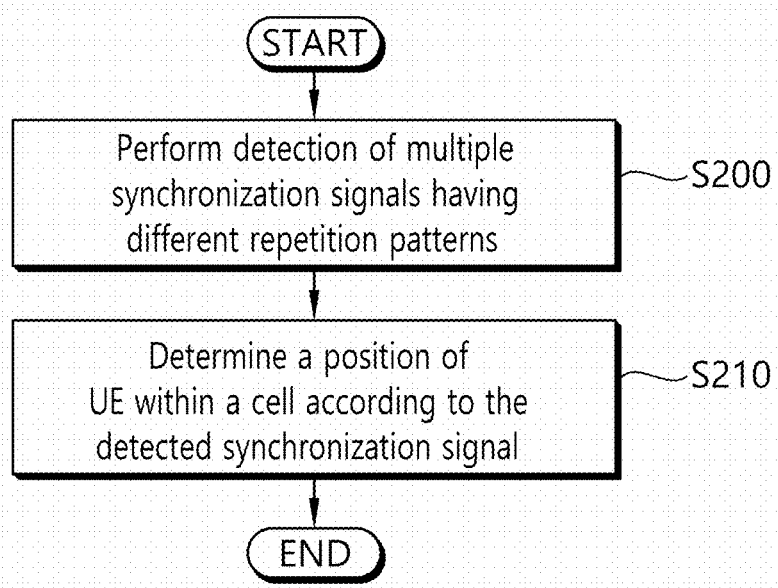
FIG. 20 shows a method for detecting a synchronization signal based on a repetition pattern by a UE according to an embodiment of the present invention.

FIG. 20 shows a method for detecting a synchronization signal based on a repetition pattern by a UE according to an embodiment of the present invention.

In step S200, the UE performs detection of multiple types of synchronization signals having different repetition patterns. In step S210, the UE determines a position of the UE within a cell according to the detected synchronization signals. The position of the UE may be determined according to the number of synchronization signals of which received power is detected to be equal to or greater than a specific reference value among the multiple types of synchronization signals. The more the number of synchronization signals of which received power is equal to or greater than the specific reference value is detected, the closer the UE is to the center of the cell. The UE may transmit information on the determined position of the UE to a base station.

In addition, the UE may synchronize according to the smallest synchronization signal of which amplitude of the received power exceeds the specific reference value among the detected synchronization signals. Alternatively, the UE may synchronize according to the largest synchronization signal of which amplitude of the received power exceeds the specific reference value among the detected synchronization signals.

Although the present invention has been described based on downlink transmission in which a base station transmits a signal to a UE, applications of the present invention is not limited thereto. The present invention may be applicable to any combination of transmitter and receiver. For example, the present invention may be applicable to the uplink transmission, device-to-device (D2D), vehicle-to-vehicle (V2V), or a signal transmission between base stations (relay, wireless backhaul, etc.).

Figure 21:
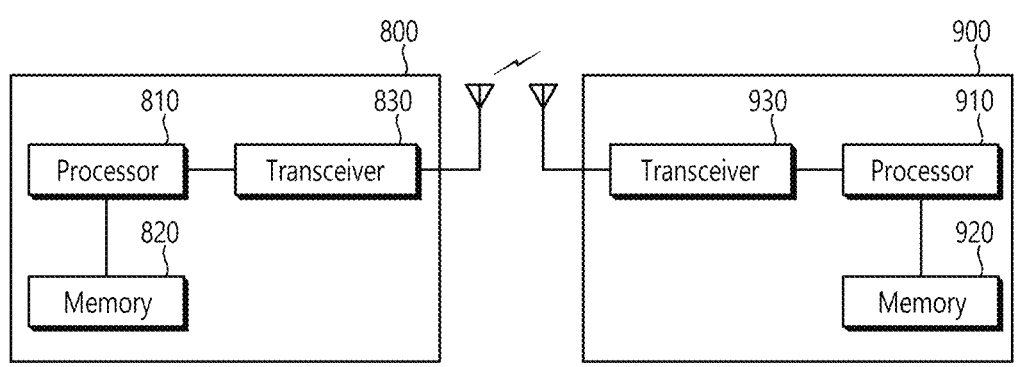
FIG. 21 shows a wireless communication system to implement an embodiment of the present invention.

FIG. 21 shows a wireless communication system to implement an embodiment of the present invention.

A BS 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for detecting multiple types of synchronization signals by a user equipment (UE) in a wireless communication system, the method comprising:
    detecting the multiple types of synchronization signals having a different number of repetitions;
    obtaining a number of specific synchronization signals among the multiple types of synchronization signals,
    wherein the specific synchronization signals include at least one synchronization signal of which received power is equal to or greater than a threshold power value;
    determining that a position of the UE is closer to a base station (BS) as the number of the specific synchronization signals increases; and
    transmitting information on the determined position of the UE to the BS.

2. The method of claim 1, further comprising:
    synchronizing based on a smallest synchronization signal of which an amplitude of the received power exceeds a reference value among the multiple types of synchronization signals.

3. The method of claim 1, further comprising:
    synchronizing based on a largest synchronization signal of which an amplitude of the received power exceeds a specific reference value among the multiple types of synchronization signals.

4. A user equipment (UE) configured to detect multiple types of synchronization signals, the UE comprising:
    at least one transceiver;
    at least one processor operably coupled with the at least one transceiver; and
    at least one computer memory operably connectable to the at least one processor and storing instructions that, when executed, cause the at least one processor to perform operations comprising:
    detecting the multiple types of synchronization signals having a different number of repetitions;
    obtaining a number of specific synchronization signals among the multiple types of synchronization signals,
    wherein the specific synchronization signals include at least one synchronization signal of which received power is equal to or greater than a threshold power value;
    determining that a position of the UE is closer to a base station (BS) as the number of the specific synchronization signals increases; and
    transmitting information on the determined position of the UE to the BS.

5. The UE of claim 4, wherein the operations further comprise:
    synchronizing based on a smallest synchronization signal of which an amplitude of the received power exceeds a reference value among the multiple types of synchronization signals.

6. The UE of claim 4, wherein the operations further comprise:
    synchronizing based on a largest synchronization signal of which an amplitude of the received power exceeds a specific reference value among the multiple types of synchronization signals.

* * * * *